United States Patent
Kim

(10) Patent No.: US 6,597,918 B1
(45) Date of Patent: Jul. 22, 2003

(54) APPARATUS AND METHOD FOR TRANSMITTING/RECEIVING LONG MESSAGE IN DIGITAL PORTABLE TERMINAL

(75) Inventor: Sung-Sik Kim, Sangju-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 328 days.

(21) Appl. No.: 09/651,773

(22) Filed: Aug. 30, 2000

(30) Foreign Application Priority Data

Sep. 8, 1999 (KR) ........................................ 1999-38096

(51) Int. Cl.[7] ................................................ H04Q 7/20
(52) U.S. Cl. ........................ 455/466; 455/414; 370/236; 370/474
(58) Field of Search ................................. 455/412, 458, 455/403, 433, 426, 566, 414, 466; 370/347, 392, 474, 913, 230, 236, 471, 337

(56) References Cited

U.S. PATENT DOCUMENTS

| | | | | |
|---|---|---|---|---|
| 6,108,530 A | * | 8/2000 | Ayabe et al. | 455/403 |
| 6,141,550 A | * | 10/2000 | Ayabe et al. | 455/433 |
| 6,154,648 A | * | 11/2000 | Comer | 455/426 |
| 6,185,208 B1 | * | 2/2001 | Liao | 370/392 |
| 6,278,886 B1 | * | 8/2001 | Hwang | 455/566 |
| 6,311,056 B1 | * | 10/2001 | Sandidge | 455/414 |
| 6,400,942 B1 | * | 6/2002 | Hansson et al. | 455/426 |
| 6,424,841 B1 | * | 7/2002 | Gustafsson | 455/466 |

* cited by examiner

Primary Examiner—Thanh Cong Le
Assistant Examiner—Andrew T Harry
(74) Attorney, Agent, or Firm—Cha & Reiter

(57) ABSTRACT

There are provided an apparatus and method for transmitting/receiving a long message by SMS (Short Message Service) in a digital portable terminal. Upon request of the SMS message transmission, a message inputted by a user is read. The read message is divided into a plurality of shorter messages with a predetermined length if the read message exceeds the maximum allowable SMS message. A header having a long message ID and divided message sequence information are generated for each divided message. The short divided messages are generated by assembling each divided message with a header and transmitting successively in an appropriate order. Upon receipt of the successive short messages, a predetermined unique long message ID is detected from the header of each short message, and the message sequence information is read from the header if the long message ID is detected from the header. The successive short messages are re-assembled based on the long message ID and the message sequence information, and the re-assembled long message is generated and stored; then, the stored long message is displayed upon user request.

11 Claims, 4 Drawing Sheets

APPARATUS AND METHOD FOR TRANSMITTING/RECEIVING LONG MESSAGE IN DIGITAL PORTABLE TERMINAL

CLAIM OF PRIORITY

This application makes reference to and claims all benefits accruing under 35 U.S.C. Section 119 from an application entitled, "Apparatus and Method for Transmitting/Receiving Long Message in Digital Portable Terminal", filed in the Korean Industrial Property Office on Sep. 8, 1999 and there duly assigned Ser. No. 99-38096.

BACKGROUND OF THE INVENTION

1. Field of the Invention

The present invention relates generally to an apparatus and method for controlling a short message service (SMS) in a digital portable terminal. More particularly, the present invention relates to an apparatus and method for transmitting/receiving a long message that exceeds a predetermined frame length specified in the SMS.

2. Description of the Related Art

A function known as a Short Message Service (SMS) allows digital portable terminals to transmit/receive a text message from one user to another. To this end, the digital portable terminal should be configured in such a way to write, edit, and transfer the short text messages. The ability to transfer a wireless text message between subscribers using the SMS feature is well received by the digital portable phone users.

The conventional SMS function, however, has a downside in that the capacity to transfer a text message is limited by the amount of data that can be processed by the SMS function. Thus, users are only allowed to transfer a specified length of a text message allowed by the system. In case that a user wishes to transmit a relatively long text message that exceeds the allowable frame length under the SMS function, the user has to divide the long text message into a plurality of short messages to be supported by the SMS function and then manually transmit each divided message one by one.

As mentioned above, the conventional digital portable terminal has some limitation in enabling users to transmit a SMS message due to the limitation of the SMS function in terms of allowable text length.

SUMMARY OF THE INVENTION

It is, therefore, an object of the present invention to provide an apparatus and method for transferring a long message which exceeds a predetermined length allowed by the SMS.

The above object can be achieved by providing an apparatus and method for transmitting/receiving a long message using the SMS in a digital portable terminal. Upon request of the SMS message transmission, a message inputted by the user is read, and the read message is divided into a plurality of shorter messages having a predetermined length. A header including a long message ID and a divided message sequence information are generated for each divided message. Each divided message is attached with the header and assembled to be transmitted successively in an appropriate order. Upon receipt of the successive short messages, the long message ID is detected from the header of each short message and the message sequence information is read from the header. The successive short messages are assembled based on the long message ID and the message sequence information and the long message is generated out of the assembled messages and stored. The stored long message is displayed upon user request.

According to one aspect of the present invention, the apparatus includes a means for storing a text message inputted by a user; a means for dividing the text message into a plurality of shorter messages having a predetermined length and for detecting the divided shorter messages; a means for generating and detecting a header information having a long message identification (ID) and a divided message sequence information of the divided shorter messages; and, a means for controlling the message storage, the message divider, and the header generator, for assembling/re-assembling each the shorter message during a transmission/reception mode using the header information, and for controlling the transmission/reception of the shorter messages in a pre-specified order.

According to one aspect of the present invention, the predetermined length mentioned above is a maximum length permitted by the SMS (short message service).

According to another aspect of the present invention, the apparatus includes a message transmitter/receiver means for transmitting/receiving the plurality of shorter messages.

According to one aspect of the present invention, the controller determines whether each of the short message received from the transmitting/receiving end exceeds a predefined SMS length.

According to another aspect of the present invention, the message sequence information represents the order of short messages after segmenting the long message at the transmitting end, and the long message identifier indicates whether one of the short messages belongs to a part of the same long message.

According to a further aspect of the present invention, the controller displays the re-assembled message stored in the storage means in response to a user request.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, detailed descriptions of well-known devices, circuits, and methods are omitted so as not to obscure the description of the present invention with unnecessary detail. Thus, it should be understood that some components of a typical portable terminal, such as a Dual Tome Multi-Frequency (DTMF) unit, a vocoder, a display unit, a key pad, and other devices, will be omitted not to obscure the subject matter of the present invention. For simplicity, the term "long message" as used herein will refer to a message exceeding the amount of data allowed in a short message frame of the SMS function.

Figure 1:
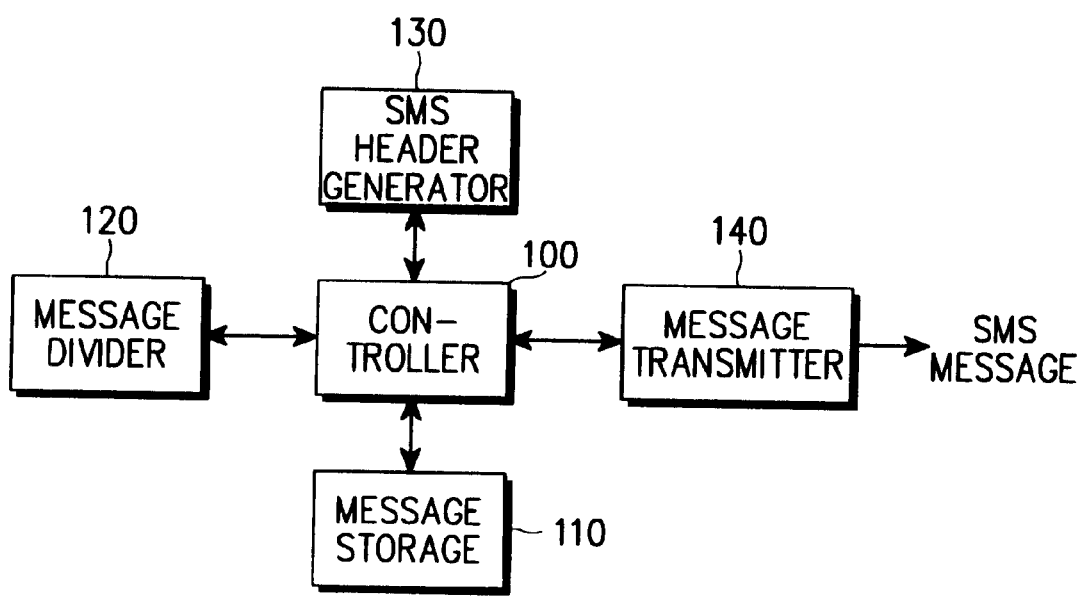
FIG. 1 is a block diagram of a long message transmitting apparatus in a digital portable terminal according to the preferred embodiment of the present invention.

FIG. 1 is a simplified block diagram of a long message transmitting apparatus that can transmit a short message using the SMS feature of a digital portable terminal according to the preferred embodiment of the present invention.

With reference to FIG. 1, a controller 100 provides overall control of the whole operation of a digital portable terminal. Especially, the controller 100 controls the SMS function according to the embodiment of the present invention. The controller 100 is implemented using a single chip microprocessor, and it controls the segmentation of a long message and the generation of SMS headers. The message storage 110 is a memory device for storing the long text message inputted by the user. The controller 100 reads the stored message stored in the message storage 110 for the transmission of the long message inputted by the user. A message transmitter 140 serves to transmit the segmented messages generated by the controller 100 and performs the radio signal transmission/reception operation between a digital portable terminal and a base station. Namely, the message transmitter 140 converts a RF signal to an IF signal, the IF signal to a baseband signal, and the baseband signal to a digital signal during the voice signal operation after a call establishment. A message divider 120 divides the retrieved read message into a plurality of shorter messages if the message inputted by a user is longer than a predetermined short message under the SMS standard. Thus, the length of each message divided by the message divider 120 fits within the SMS standard frame size. The SMS header generator 130 generates an SMS header for each divided message under the control of the controller 100. Here, the SMS header includes a typical short message transmission information, a message identification (ID) indicating that the segmented message is a portion of the original long message, and a sequence number indicating the order of the segmented messages. The message ID information and the message segment sequence number are used to recover the original long message at the receiver end.

Figure 2:
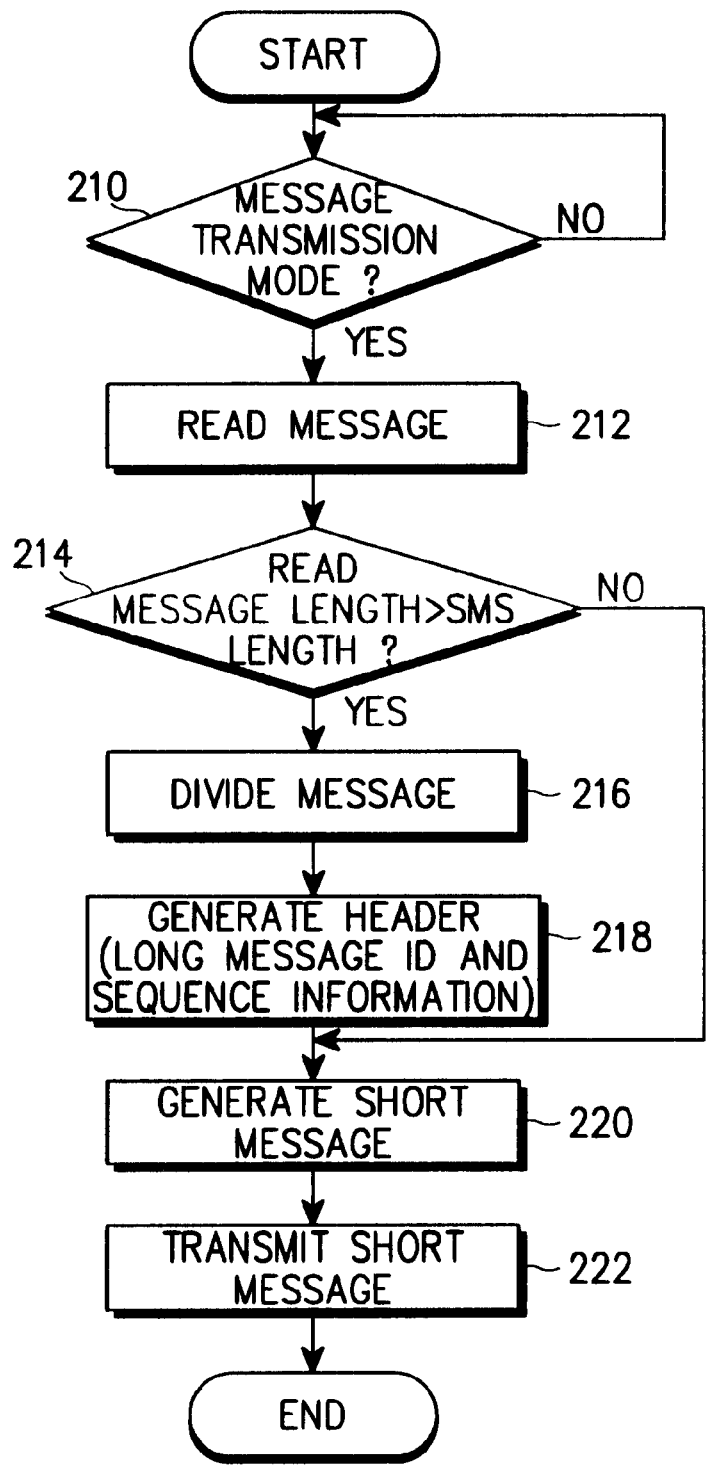
FIG. 2 is a flowchart illustrating a long message transmitting method in a digital portable terminal according to the preferred embodiment of the present invention.

FIG. 2 is a flowchart illustrating a method for transmitting the long message of a digital portable terminal according to the preferred embodiment of the present invention.

Referring to FIG. 2, the controller 100 determines whether a user has requested an entry for an SMS message transmission mode in step 210. If the SMS message transmission mode is activated, the controller 100 reads a message inputted by the user from the message storage 110, in step 212. Then, the controller 100 checks whether the length of the retrieved message is longer than a maximum length permitted by the SMS message standard, in step 214, in order to determine whether the retrieved message should be transmitted through a regular short message transmission mode or a long message transmission mode. If the retrieved message is longer than the SMS standard length, the controller 100 divides the message into a plurality of short messages complying with the SMS standard length, in step 216. In step 218, the controller 100 controls the header generator 130 to generate an SMS header for each segmented short message. Here, the header includes a separate long message ID indicating that the transmitted message is a part of a given long message and a sequence number information indicating the sequence order of the segmented messages. The controller 100 generates the segmented short messages by attaching the headers to the respective segmented messages in step 220. Then, the short messages with the header are transmitted through the message transmitter 140 in step 222. At the receiving end, the receiver recovers the transmitted short messages back to the original long message by analyzing the header information.

Figure 3:
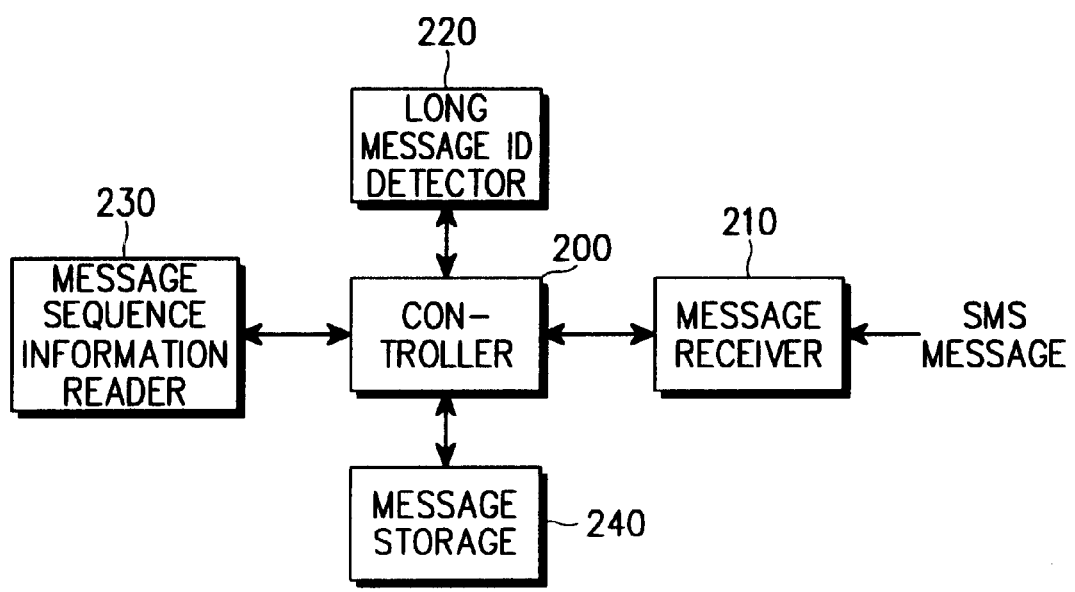
FIG. 3 is a block diagram of a long message receiving apparatus in a digital portable terminal according to the preferred embodiment of the present invention; and, FIG. 4 is a flowchart illustrating a long message receiving method in a digital portable terminal according to the preferred embodiment of the present invention.

FIG. 3 is a block diagram of a long message receiving apparatus of the digital portable terminal according to the preferred embodiment of the present invention.

Referring to FIG. 3, a controller 200 provides the overall control to a digital portable terminal which is similar to the controller 100 of FIG. 1. The controller 200 is implemented using a one-chip microprocessor according to the present invention for providing the control operation related to the analysis of a header, the detection of a long message ID and message sequence number information, and the assembly operation of the received messages. A message storage 240 is divided into a short message storing area and a long message storing area for storing the received message from the transmitting end. A message receiver 210 converts the received SMS message into digital signals and feeds the converted digital data to the controller 200. A long message ID detector 220 detects the ID information from the header of the received message to determine whether the received message is to be stored in the message storage 240 if a regular SMS message is received or re-assembled if the received messages represent sub-messages of the original long message. A message sequence information reader 230 determines the order of reading the received message order based on the sequence information provided in the header portion of the received message. The controller 200 controls the detection of the message sequence information and the assembly operation of the received messages based on whether the long message ID has been detected or not.

Figure 4:
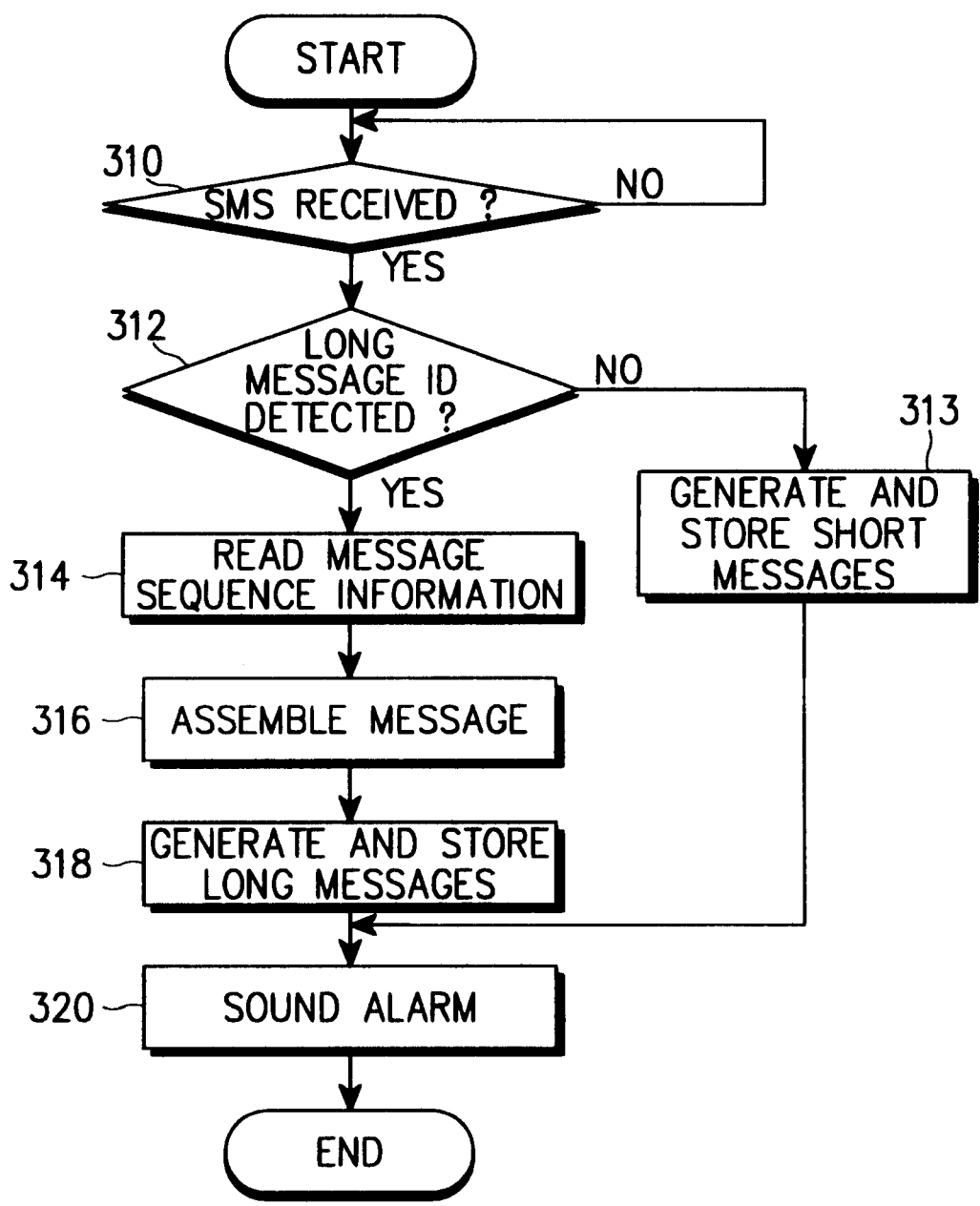

FIG. 4 is a flowchart illustrating a method for receiving a long message of a digital portable terminal according to the preferred embodiment of the present invention.

Referring to FIG. 4, the controller 200 determines whether a message has been received through the SMS in step 310. Upon receipt of the message, the controller 200 controls the long message ID detector 220 to determine whether the header of the received message includes a long message ID in step 312. If the long message ID is detected, the controller 200 controls the message sequence information reader 230 to detect the message sequence information from the header of the received message in step 314, and assembles the messages based on the message sequence information in step 316. That is, when the long message arrives in form of short messages, the sequence information attached in the header of each short message helps to re-assemble the long message in the original format. Thereafter, the controller 200 determines the completion of the re-assembling operation and stores the re-assembled long message in the message storage 240 in step 318, then notifies the reception of the complete long message using a sound alarm in step 320.

On the other hand, if the long message ID is not detected in step 312, it is determined that the received message is a regular SMS message that does not require the re-assembly operation. Then, the controller 200 generates the received SMS message among all received messages and stores the generated SMS message in step 313. In step 320, the controller 200 notifies the reception of the short SMS message using sound alarm.

While the above description discloses separate transmitting apparatus and receiving apparatus, it should be noted that the transmitting and receiving apparatuses are incorporated in the terminal as one unit. In accordance with the present invention, a user can transmit/receive a text message regardless of the message length limitation imposed by the SMS standard. That is, user can transmit any lengthy message exceeding the SMS standard length without dividing the message into multiple short messages and repeatedly transmitting the divided short messages manually.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An apparatus for transmitting a long message using a short message service (SMS) in a digital portable terminal, comprising:
    a message storage for storing a text message inputted by a user, said message storage having a short message area and a long message area;
    a message divider for dividing said text message into a plurality of shorter messages having a predetermined length;
    a header generator for generating a header information including a long message identifier and divided message sequence information for said divided shorter messages;
    a long message detector for detecting a long message identification from each header of said divided shorter messages;
    a sequence information reader for reading a message order information from each header of said divided shorter messages; and
    a controller for selectively reading out a corresponding text message stored in one of said short message area and said long message area, for generating the plurality of said shorter messages by assembling each divided said shorter message with the header information, for controlling the transmission of said shorter messages consecutively in a pre-specified order, and for controlling the re-assembly of each divided said shorter message according to said long message identifier and said message sequence information thereof.

2. The apparatus of claim 1, wherein said predetermined length is a maximum length permitted in SMS (short message service).

3. The apparatus of claim 1, further comprising a message transmitter coupled to said controller for transmitting the plurality of said shorter messages generated by said controller.

4. The apparatus of claim 1, wherein said message sequence information represents the order of said short messages after segmenting said long message.

5. The apparatus of claim 1, wherein said long message identifier indicates whether one of said short messages belongs to said long message.

6. The apparatus of claim 1, wherein said controller determines whether each said short message received exceeds a predefined SMS length.

7. The apparatus of claim 1, wherein said controller displays said reassembled message stored in said storage means in response to a user request.

8. A method for transmitting a long message using a short message service (SMS) in a digital portable terminal, comprising the steps of:
    retrieving a text message inputted by a user upon receiving a request for a SMS message transmission;
    dividing the text message into a plurality of shorter messages having a predetermined length if the read message exceeds a maximum frame length allowed in the SMS;
    generating a header including a long message information and a message sequence information for each divided shorter message;
    attaching the header to each divided shorter message for transmission;
    detecting the long message information from the header of each divided shorter message during an SMS receiving mode;
    retrieving the message sequence information from the header of each divided shorter message;
    re-assembling the plurality of shorter messages according to the long message information and the message sequence information;
    storing the re-assembled long message in a long message area of a storage means; and
    displaying the re-assembled long message in response to a user request.

9. The method of claim 8, wherein the predetermined length is a maximum length permitted in the SMS.

10. The method of claim 8, further comprising the step of sounding an alarm to notify the completion of the re-assembled long message.

11. The method of claim 8, wherein the message sequence information represents the order of short messages after segmenting the long message from a transmitting end.

* * * * *